(12) United States Patent
Bernard (10) Patent No.: US 9,048,719 B1
(45) Date of Patent: Jun. 2, 2015

(54) PHOTOVOLTAIC CELL AND RELATED METHOD

(76) Inventor: Jack L. Bernard, Kerrville, TX (US)

( * ) Notice: Subject to any disclaimer, the term of this patent is extended or adjusted under 35 U.S.C. 154(b) by 828 days.

(21) Appl. No.: 12/928,520

(22) Filed: Dec. 14, 2010

(51) Int. Cl.
*H02K 44/08* (2006.01)
*F24J 2/07* (2006.01)
*F24J 2/08* (2006.01)

(52) U.S. Cl.
CPC .. *H02K 44/08* (2013.01); *F24J 2/08* (2013.01)

(58) Field of Classification Search
CPC ..................................................... H05H 1/0025
See application file for complete search history.

(56) References Cited

U.S. PATENT DOCUMENTS

| | | | | |
|---|---|---|---|---|
| 4,095,118 A | * | 6/1978 | Rathbun | 290/2 |
| 4,127,453 A | * | 11/1978 | Radebold | 205/339 |
| 4,454,865 A | * | 6/1984 | Tammen | 126/640 |
| 5,366,701 A | * | 11/1994 | Taylor et al. | 422/186.04 |
| 2006/0035266 A1 | * | 2/2006 | Kinoshita et al. | 435/6 |
| 2006/0076047 A1 | * | 4/2006 | Green et al. | 136/243 |
| 2008/0156981 A1 | * | 7/2008 | Miller et al. | 250/287 |
| 2011/0048916 A1 | * | 3/2011 | Novak | 201/3 |

OTHER PUBLICATIONS

"Rasi" = Rasi et al "Trace compounds of biogas from different biogas production plants" Energy 32 (2007) 1375-1380.*

* cited by examiner

*Primary Examiner* — Jennifer Michener
*Assistant Examiner* — Christopher Danicic
(74) *Attorney, Agent, or Firm* — Wayne J. Colton, Inc.

(57) ABSTRACT

A photovoltaic cell for the production from solar radiation of electrical energy includes a reservoir adapted to contain a quantity of photoionizable solution, a solar powered plasma generator in fluid communication with the reservoir, a solar powered ionization chamber in fluid communication with the plasma generator, an electrode baffle in fluid communication with the ionization chamber and a return fluid communication path from the electrode baffle to the reservoir. As arranged, the reservoir, the plasma generator, the ionization chamber and the electrode baffle form a closed fluid loop in order from the reservoir to the plasma generator to the ionization chamber to the electrode baffle and back to the reservoir.

14 Claims, 7 Drawing Sheets

PHOTOVOLTAIC CELL AND RELATED METHOD

FIELD OF THE INVENTION

The present invention relates to energy production. More particularly, the invention relates to a photovoltaic cell and related method utilizing photoionizable solutions for the production from solar radiation of electrical energy.

BACKGROUND OF THE INVENTION

As world population continues to grow and nonrenewable natural resources become increasingly depleted, the development of alternative energy sources becomes ever more important. Additionally, the increased pressures on the environment dictate that priority should be given to the development of clean energy sources. Although in recent years the available methods and apparatus for harnessing of solar power have been vastly improved, most of these improvements remain costly at best and, as a result, are only marginally implemented.

Given the critical importance of solar energy as an unlimited and clean energy source, any improvement in the available technology is of great importance and merits encouragement. With this in mind, it is an overriding object of the present invention to improve over the prior art by setting forth a completely new and innovative method and apparatus for converting solar radiation to electrical energy, which electrical energy may then be applied to useful ends.

SUMMARY OF THE INVENTION

In accordance with the foregoing objects, the present invention—a photovoltaic cell for the production from solar radiation of electrical energy—generally comprises a reservoir adapted to contain a quantity of photoionizable solution, a solar powered plasma generator in fluid communication with the reservoir, a solar powered ionization chamber in fluid communication with the plasma generator, an electrode baffle in fluid communication with the ionization chamber and a return fluid communication path from the electrode baffle to the reservoir. As arranged, the reservoir, the plasma generator, the ionization chamber and the electrode baffle form a closed fluid loop in order from the reservoir to the plasma generator to the ionization chamber to the electrode baffle and back to the reservoir.

The plasma generator is adapted to convert the photoionizable solution from a liquid phase to a plasma phase, whereafter the plasma phase of the photoionizable solution is conveyed into the ionization chamber, which is adapted to ionize the plasma phase of introduced solution. The ionized solution is then introduced to the electrode baffle where electrical energy is conducted from the ionized plasma phase of the solution through a plurality of electrodes, the conduction causing the plasma phase of the solution to reconvert to a liquid phase. The reconverted liquid phase of the photoionizable solution is then returned back to said reservoir for cycling again through the closed cell.

In use, solar radiation is converted to electrical energy through the steps of drawing a photoionizable solution from a reservoir into a solar powered plasma generator, the drawing being carried out under solar power; converting in the plasma generator the photoionizable solution from a liquid phase to a plasma phase; conveying the plasma phase of the photoionizable solution into a solar powered ionization chamber; photoionizing in the ionization chamber the plasma phase of the photoionizable solution, thereby converting the photoionizable solution to an ionized plasma solution; conveying the ionized plasma solution into an electrode baffle; discharging the ionized plasma solution in the electrode baffle between a plurality of electrodes, the discharging step generating electrical energy and simultaneously reconverting the ionized plasma solution to a liquid phase; and reintroducing from the electrode baffle to the reservoir the liquid phase of the photoionizable solution.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 1:
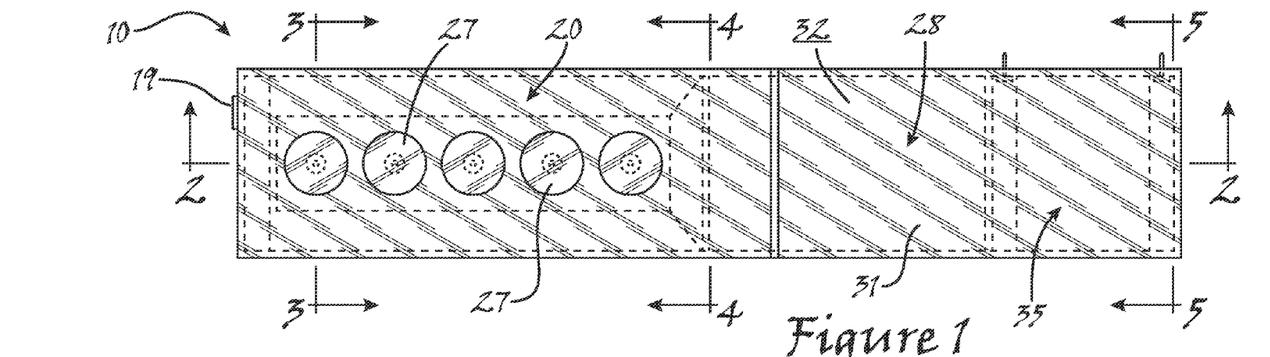
FIG. 1 shows, in a top plan view, the preferred implementation of the photovoltaic cell of the present invention.
Figure 2:
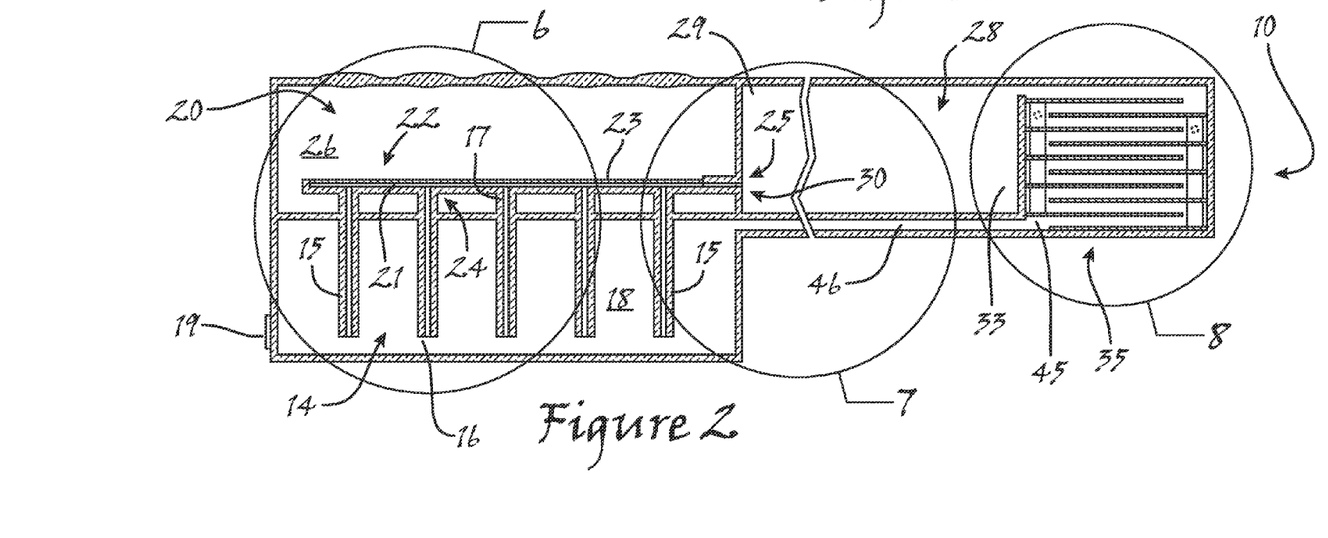
FIG. 2 shows, in a cross-sectional view taken through cut line 2-2 of FIG. 1, the various major elements of the implementation of the photovoltaic cell of FIG. 1.

Referring now to the figures, and to FIGS. 1 and 2 in particular, the preferred implementation of the photovoltaic cell 10 of the present invention is shown to generally comprise a reservoir 14 adapted to contain a quantity of a photoionizable solution 11; a solar powered plasma generator 20 in fluid communication with the reservoir 14; a solar powered ionization chamber 28, the inlet 30 of which is in fluid communication with the open ended outlet 25 from the plasma generator 20; and an electrode baffle 35, the inlet 37 of which is in fluid communication with the outlet 34 from the ionization chamber 28 and which comprises an effluent 45 in fluid communication with the reservoir 14. As will be better understood further herein, the reservoir 14, the plasma generator 20, the ionization chamber 28 and the electrode baffle 35 as shown and described are arranged to form a closed loop for circulation of the photoionizable solution 11 in order from the reservoir 14 to the plasma generator 20 to the ionization chamber 28 to the electrode baffle 35 and back to the reservoir 14 whereafter the described cycle continues. As also will be better understood further herein, as the photoionizable solution 11 is circulated through the photovoltaic cell 10, the photovoltaic cell 10 harnesses solar radiation to impart electrical charge to the photoionizable solution 11 which electrical charge is thereafter captured by the photovoltaic cell 10 as electrical energy.

Figure 3:
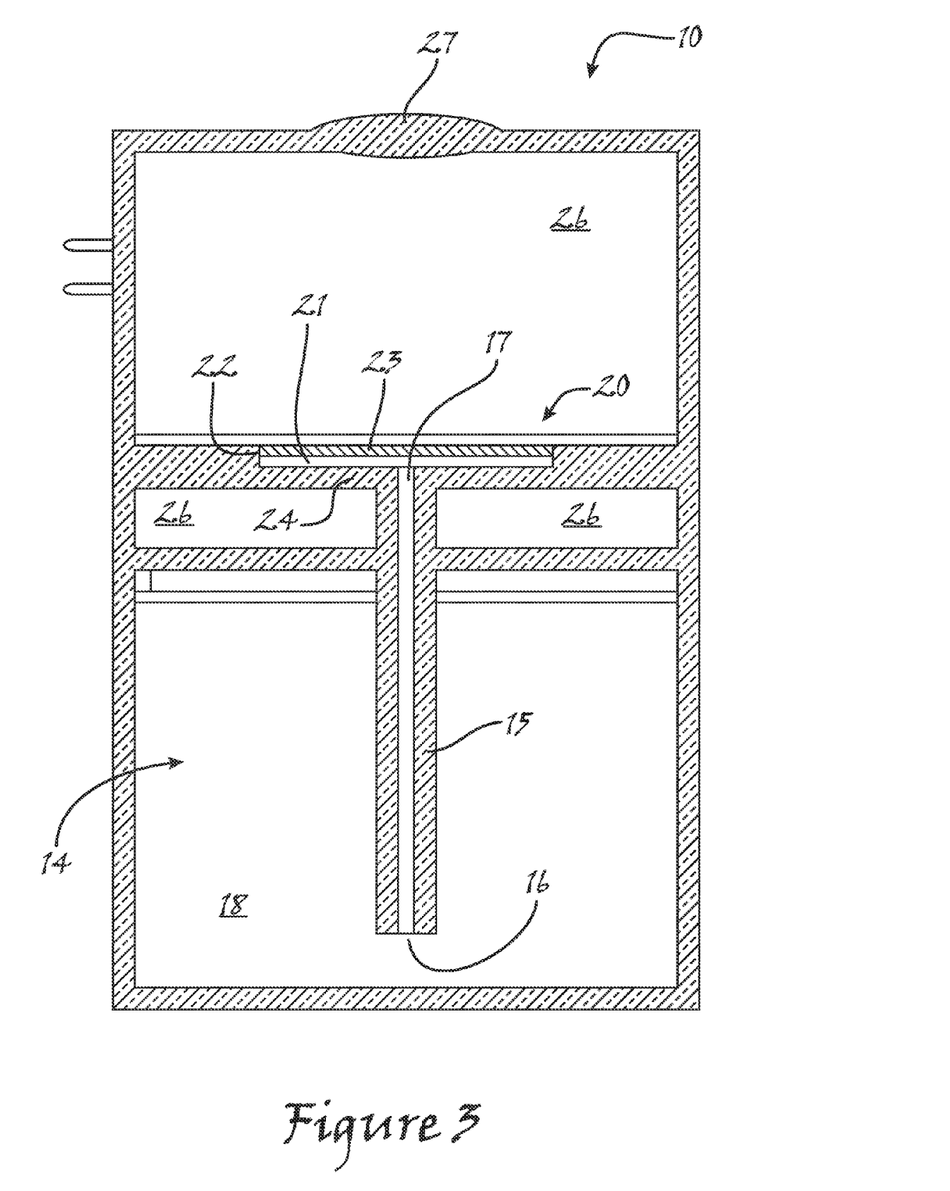
FIG. 3 shows, in a cross-sectional view taken through cut line 3-3 of FIG. 1, various details of the reservoir and the solar powered plasma generator of the implementation of the photovoltaic cell of FIG. 1.
Figure 6:
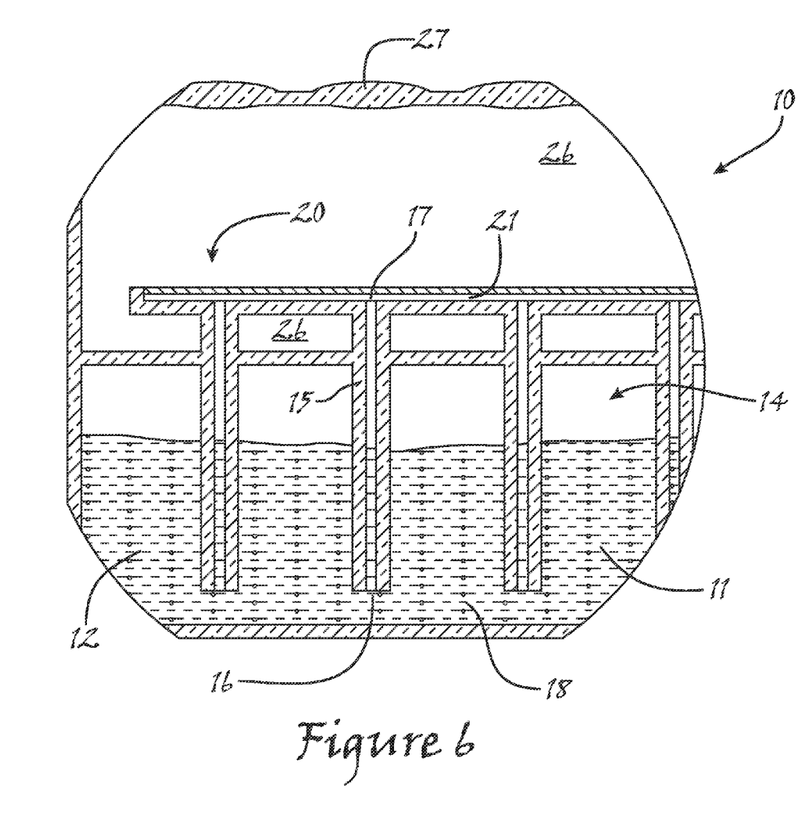
FIG. 6 shows, in a detail view taken from FIG. 2, various details of the reservoir and the solar powered plasma generator of the implementation of the photovoltaic cell of FIG. 1 as operational with a photoionizable solution contained therein.

As particularly shown in FIGS. 2, 3 and 6, the preferred implementation of the photovoltaic cell 10 of the present invention contemplates the provision of a plurality of capillary tubes 15 for providing the necessary fluid communication for the photoionizable solution 11 between the reservoir 14 and the solar powered plasma generator 20. As shown in the figures, and best shown in FIGS. 3 and 6, each provided capillary tube 15 comprises a first end 16 located in the bottom portion 18 of the reservoir and a second end 17 terminating in the bottom 24 of the solar powered plasma generator 20. As also shown in the figures, the solar powered plasma generator 20 preferably comprises an elongate slot 21, the top 22 of which slot 21 is formed as a heating plate 23, which is most preferably constructed of a metal material chosen to be nonreactive with the photoionizable solution 11.

Additionally, the solar powered plasma generator 20 as implemented in the described preferred embodiment comprises a plurality of lenses 27 (one lens 27 for each provided capillary tube 15), preferably constructed of optical grade glass, adapted and positioned to focus incident solar radiation onto the upper surface of the heating plate 23 just above each point of termination 17 into the solar powered plasma generator 20 of the provided capillary tubes 15. As will be appreciated by those of ordinary skill in the art in light of this exemplary description, the inventive arrangement as described enables utilization of incident solar radiation for drawing a quantity of the photoionizable solution 11 from the reservoir 14 into the solar powered plasma chamber 20 and simultaneously heating, within the slot 21 of the solar powered plasma chamber 20, the drawn in photoionizable solution 11, thereby converting the photoionizable solution 11 from a liquid phase 12 to a plasma phase 13.

Because considerable heat may be produced in operation of the solar powered plasma generator 20, the slot 21 and immediately surrounding structures are preferably suspended within a vacuum chamber 26. As will be appreciated with the aid of this exemplary description, the provision of such a vacuum chamber 26 greatly diminishes the chance that the concomitant heating will cause cracking or other damage to the adjacent structures of the photovoltaic cell 10. Additionally, the vacuum chamber 26 serves to prevent the formation of condensation in the focal path of the lenses 27, thereby ensuring maximization of the solar radiation directed onto the heating plate 23.

Figure 4:
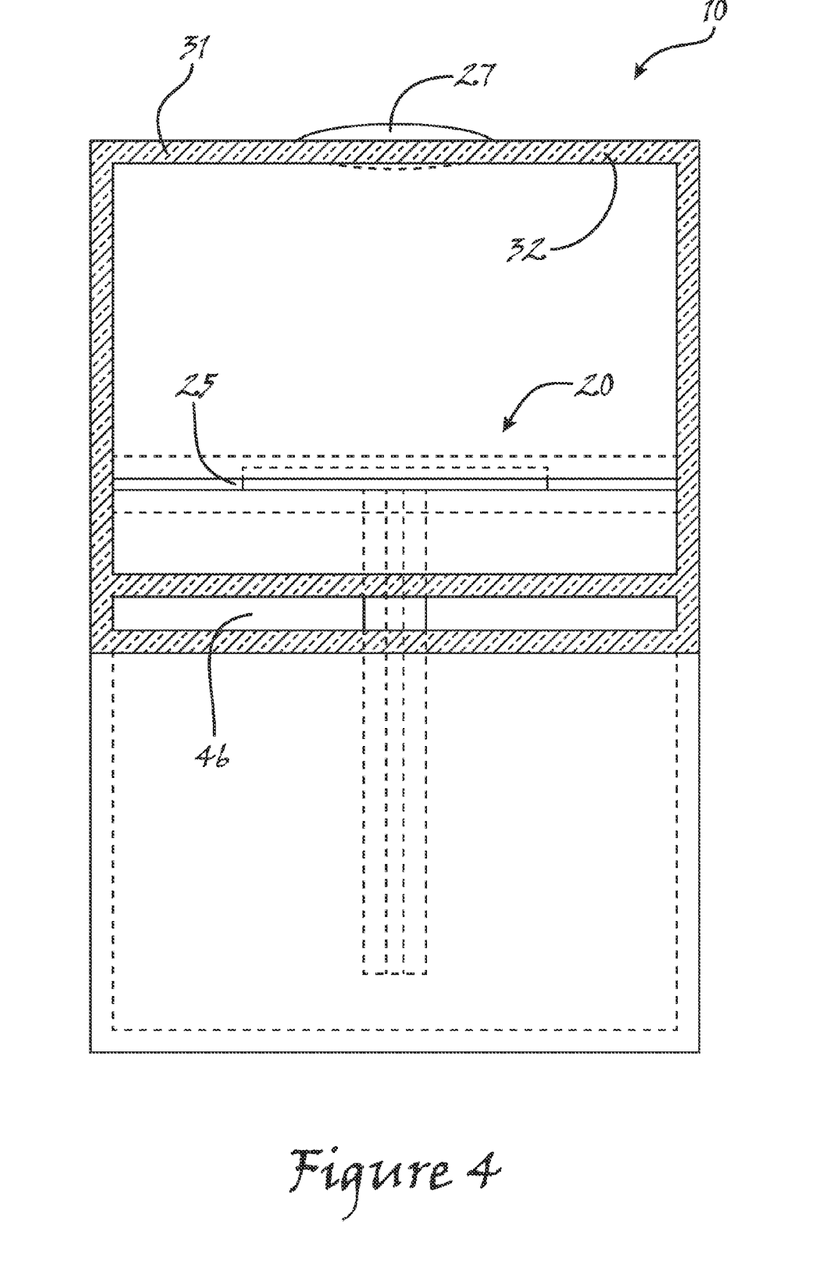
FIG. 4 shows, in a cross-sectional view taken through cut line 4-4 of FIG. 1, various details of the interface between the solar powered plasma generator and the solar powered ionization chamber of the implementation of the photovoltaic cell of FIG. 1.
Figure 5:
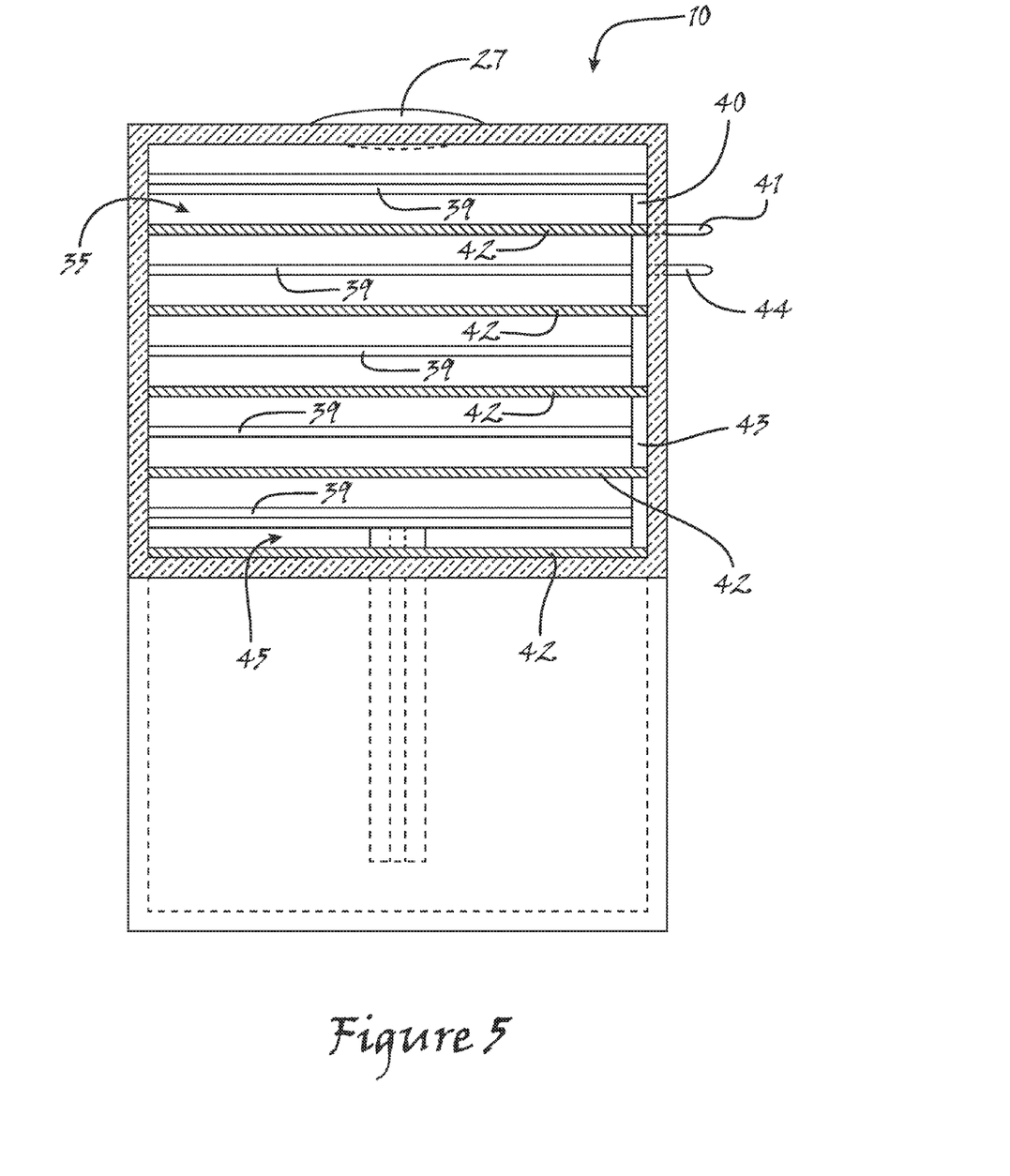
FIG. 5 shows, in a cross-sectional view taken through cut line 5-5 of FIG. 1, various details of the electrode baffle of the implementation of the photovoltaic cell of FIG. 1.
Figure 7:
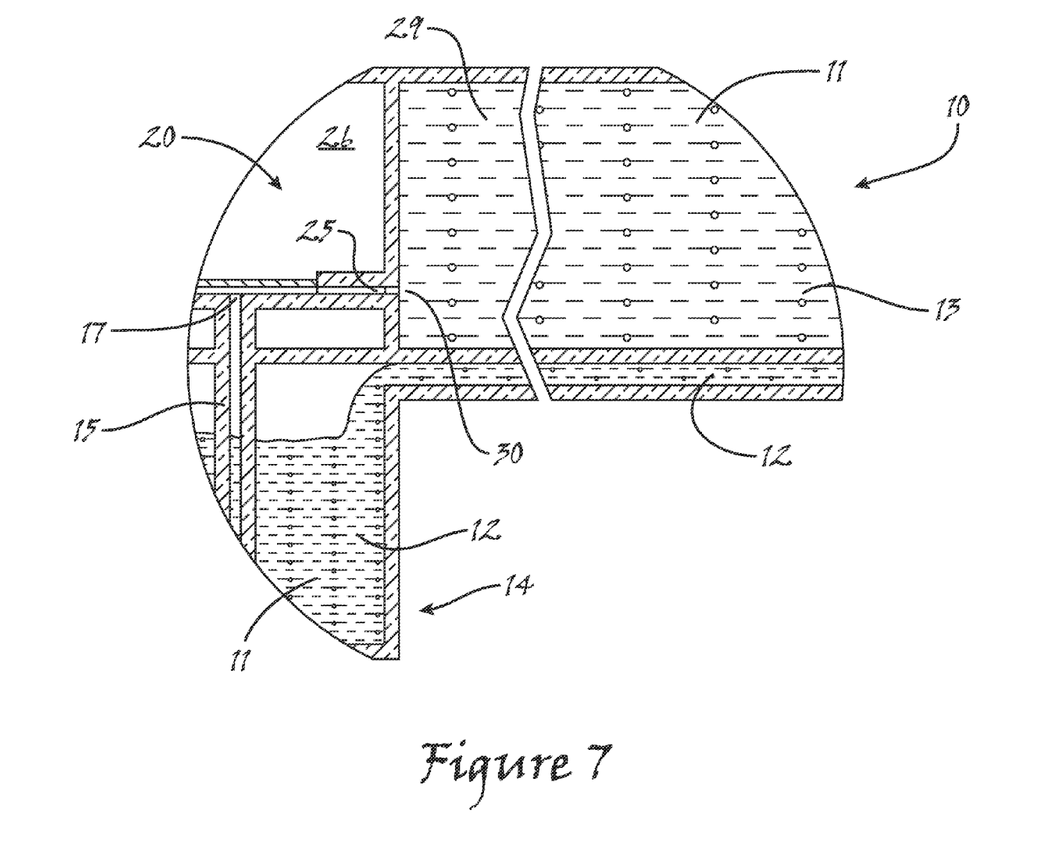
FIG. 7 shows, in a detail view taken from FIG. 2, various details of the reservoir, the solar powered plasma generator and the solar powered ionization chamber of the implementation of the photovoltaic cell of FIG. 1 as operational with a photoionizable solution contained therein.
Figure 8:
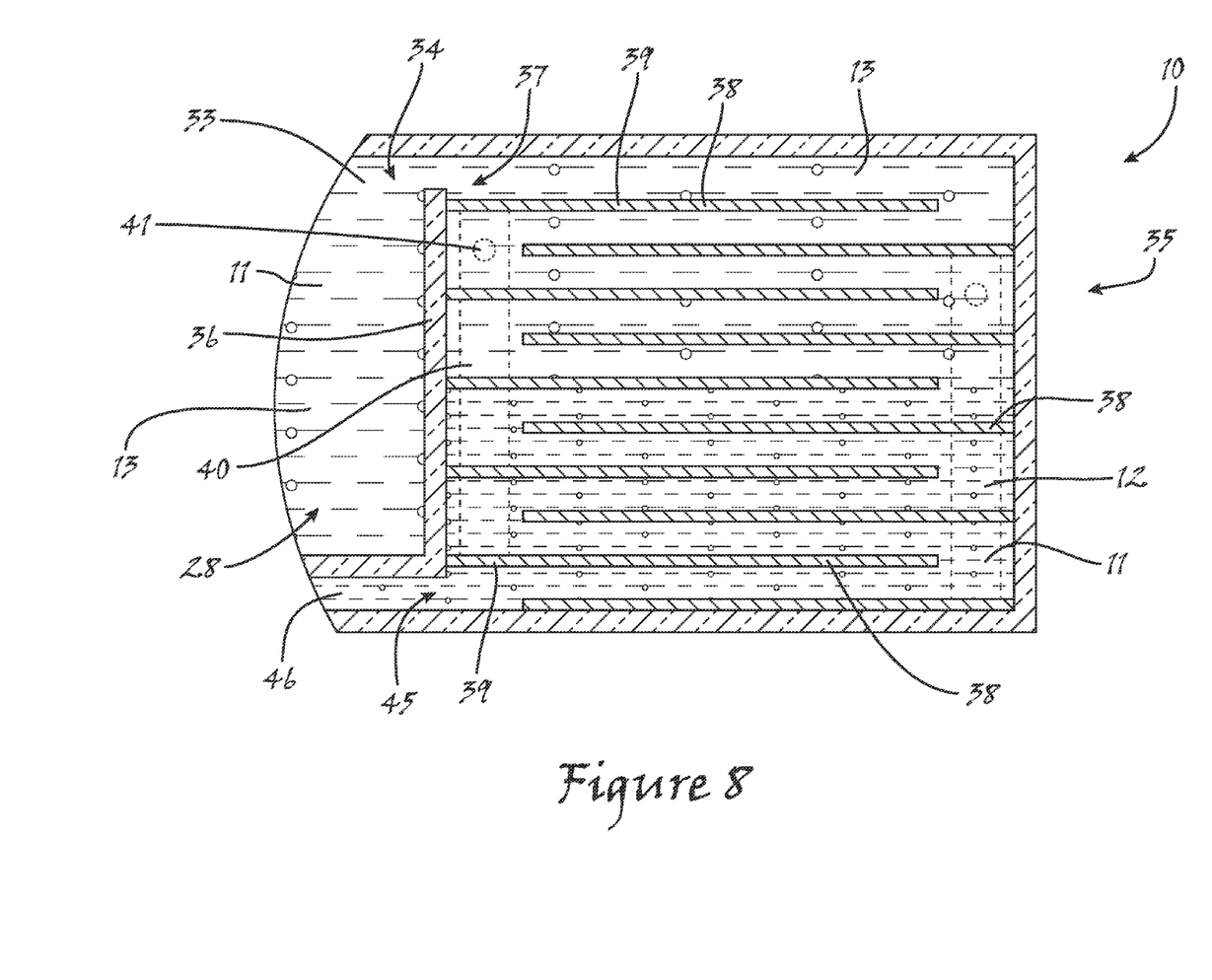
FIG. 8 shows, in a detail view taken from FIG. 2, various details of the solar powered ionization chamber and the electrode baffle of the implementation of the photovoltaic cell of FIG. 1 as operational with a photoionizable solution contained therein.

In any case, as the photoionizable solution 11 is converted within the solar powered plasma generator 20 from its liquid phase 12 to the plasma phase 13, the photoionizable solution 11 expands within the slot 21 of the solar powered plasma generator 20 escaping through the open ended outlet 25 from the slot 21, as particularly shown in FIGS. 2, 4 and 7, and into a first end 29 of the solar powered ionization chamber 28. As shown in the figures, the top 31 of the solar powered ionization chamber 31 comprises preferably optical grade glass 32. In this manner, the plasma phase 13 of the photoionizable solution 11 may be ionized by solar radiation incident on the top 31 of the solar powered ionization chamber 31 and passing through the glass 32 thereof. Having acquired additional charge within the solar powered ionization chamber 31, the now photoionized solution 11, still in its gaseous plasma form 13, is passed over a weir 36 at the second end 33 of the solar powered ionization chamber 28 and into the electrode baffle 35.

As particularly shown in FIGS. 1, 2, 5 and 8, the electrode baffle 35 as implemented according to the preferred embodiment of the present invention comprises a plurality of electrodes 38, which, as is otherwise conventional, comprise dissimilar metals selected according to the chosen photoionizable solution 11 which at this stage acts as the electrolyte solution for the photovoltaic cell 10. In the most preferred implementation of the present invention, the electrode baffle 35 comprises a plurality of anodes 39 connected through a first common conductor 40 to a first terminal 41 and a plurality of cathodes 42 connected through a second common conductor 43 to a second terminal 44, the terminals 43, 44 serving to pass the generated electrical energy from the photovoltaic cell 10 to any useful purpose. As will be appreciated by those of ordinary skill in the art, the choice of material for the construction of the structural framework of the electrode baffle 35 (shown the figures to comprise glass) should take into consideration the necessity to insulate between the anodes 39 and cathodes 42 and similar elements.

Finally, the electrode baffle 35 comprises an effluent 45 therefrom for returning the photoionizable solution 11 to the reservoir 14. At this point, it is noted that due to the cooling that takes place as charge is stripped away in the electrode baffle 35 the solution 11 will have condensed to return to its liquid phase 12. As a result, the again liquid phase 12 of the photoionizable solution 11 may simply flow from the effluent 45 into the reservoir 14, to which end a return channel 46 may be provided if required to accommodate any particular physical configuration of the photovoltaic cell 10. In any case, it is noted that directional flow through the photovoltaic cell 10 of the photoionizable solution 11 is facilitated by the cooling and condensing that takes place within the electrode baffle 35, which, of course, tends to draw the ionized plasma phase 13 of the solution 11 from the solar powered ionization chamber 28 into the electrode baffle 35.

Finally, while Applicant has discovered that the photoionizable solution 11 may generally comprise any combustible hydrocarbon, known to be susceptible to ionization, it is noted that selection of a halogenated hydrocarbon generally carries the benefit of greater capacity for ionization. In the most preferred implementation, Applicant utilizes for the photoionizable solution 11 a spiro-benzopyran.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, those of ordinary skill in the art will recognize that an appropriate filling port 19 may be provided in connection with the reservoir 14 for introduction thereto of the required photoionizable solution 11.

Additionally, those of ordinary skill in the art, with the aid of this exemplary description, will appreciate that the various constituent components of the photovoltaic cell 10 of the present invention may generally be constructed utilizing otherwise conventional materials and methods such as are well known to those of ordinary skill in the art. Although the choice of materials as may be utilized, which, of course, will generally dictate the methods for manufacture and assembly thereof, may vary widely, it is noted that in all cases care should be taken to ensure that the chosen materials are non-reactive with the selected photoionizable solution 11. Still further, care should be taken to ensure that any deviation from materials otherwise specified herein do not compromise the purpose of such selection. In any case, because the scope of the present invention is much broader than any particular embodiment, the foregoing detailed description should not be construed as a limitation of the scope of the present invention, which is limited only by the claims appended hereto.

What is claimed is:

1. A photovoltaic cell for the production from solar radiation of electrical energy, said photovoltaic cell comprising:
   a reservoir adapted to contain a quantity of photoionizable solution;
   a solar powered plasma generator in fluid communication with said reservoir through a plurality of capillary tubes, said plasma generator comprising a heating plate adapted to contact the photoionizable solution and configured to be heated by solar radiation to convert said photoionizable solution, as drawn under solar power from said reservoir into said solar powered plasma generator through the plurality of capillary tubes, from a liquid phase to a plasma phase;
   a solar powered ionization chamber in fluid communication with said plasma generator, said ionization chamber being adapted to ionize said plasma phase of said solution, as conveyed from said solar powered plasma generator into said solar powered ionization chamber;
   a plurality of lenses configured and adapted to focus light onto the heating plate where the capillary tubes terminate at the heating plate; an electrode baffle in fluid communication with said ionization chamber, said electrode baffle being adapted to conduct electrical energy from the ionized plasma phase of said solution, as conveyed from said solar powered ionization chamber into said electrode baffle, through a plurality of electrodes, said conduction causing said plasma phase of said solution to reconvert to a liquid phase; and
   wherein:
      said reservoir is in fluid communication with said electrode baffle such that said reservoir, said plasma generator, said ionization chamber and said electrode baffle form a closed fluid loop in order from said reservoir to said plasma generator to said ionization chamber to said electrode baffle and back to said reservoir; and
      electrical charge imparted by solar radiation to said photoionizable solution is captured as electrical energy as said photoionizable solution is circulated through said closed loop.

2. The photovoltaic cell for the production from solar radiation of electrical energy as recited in claim 1, wherein said photoionizable solution comprises a combustible hydrocarbon.

3. The photovoltaic cell for the production from solar radiation of electrical energy as recited in claim 2, wherein said combustible hydrocarbon is halogenated.

4. The photovoltaic cell for the production from solar radiation of electrical energy as recited in claim 1, wherein said photoionizable solution comprises a spiro-benzopyran.

5. The photovoltaic cell for the production from solar radiation of electrical energy as recited in claim 1, wherein said fluid communication between said reservoir and said solar powered plasma generator is provided by a capillary tube.

6. The photovoltaic cell for the production from solar radiation of electrical energy as recited in claim 5, wherein said fluid communication between said reservoir and said solar powered plasma generator is provided by a plurality of capillary tubes.

7. The photovoltaic cell for the production from solar radiation of electrical energy as recited in claim 5, wherein said solar powered plasma generator comprises a lens adapted to focus incident solar radiation onto a portion of said solar powered plasma generator.

8. A photovoltaic cell for the production from solar radiation of electrical energy, said photovoltaic cell comprising:
   a reservoir containing a quantity of photoionizable solution;
   a solar powered plasma generator in fluid communication with said reservoir through a plurality of capillary tubes, said plasma generator comprising a heating plate in contact with the photoionizable solution and configured to be heated by solar radiation to convert said photoionizable solution, as drawn under solar power from said reservoir into said solar powered plasma generator through the plurality of capillary tubes, from a liquid phase to a plasma phase;
   a solar powered ionization chamber in fluid communication with said plasma generator, said ionization chamber being adapted to ionize said plasma phase of said solution, as conveyed from said solar powered plasma generator into said solar powered ionization chamber;
   a plurality of lenses configured and adapted to focus light onto the heating plate where the capillary tubes terminate at the heating plate; an electrode baffle in fluid communication with said ionization chamber, said electrode baffle being adapted to conduct electrical energy from the ionized plasma phase of said solution, as conveyed from said solar powered ionization chamber into said electrode baffle, through a plurality of electrodes, said conduction causing said plasma phase of said solution to reconvert to a liquid phase; and
   wherein:
      said reservoir is in fluid communication with said electrode baffle such that said reservoir, said plasma generator, said ionization chamber and said electrode baffle form a closed fluid loop in order from said reservoir to said plasma generator to said ionization chamber to said electrode baffle and back to said reservoir; and
      electrical charge imparted by solar radiation to said photoionizable solution is captured as electrical energy as said photoionizable solution is circulated through said closed loop.

9. The photovoltaic cell for the production from solar radiation of electrical energy as recited in claim 8, wherein said photoionizable solution comprises a combustible hydrocarbon.

10. The photovoltaic cell for the production from solar radiation of electrical energy as recited in claim 9, wherein said combustible hydrocarbon is halogenated.

11. The photovoltaic cell for the production from solar radiation of electrical energy as recited in claim 8, wherein said photoionizable solution comprises a spiro-benzopyran.

12. The photovoltaic cell for the production from solar radiation of electrical energy as recited in claim 8, wherein said fluid communication between said reservoir and said solar powered plasma generator is provided by a capillary tube.

13. The photovoltaic cell for the production from solar radiation of electrical energy as recited in claim 12, wherein said fluid communication between said reservoir and said solar powered plasma generator is provided by a plurality of capillary tubes.

14. The photovoltaic cell for the production from solar radiation of electrical energy as recited in claim 12, wherein said solar powered plasma generator comprises a lens adapted to focus incident solar radiation onto a portion of said solar powered plasma generator.

* * * * *